United States Patent [19]

Lovell, Jr.

[11] Patent Number: 5,172,510

[45] Date of Patent: Dec. 22, 1992

[54] SEMI-ARTIFICIAL FISH LURE

[76] Inventor: Charles F. Lovell, Jr., 2142 Haverford Dr., Chesapeake, Va. 23320

[21] Appl. No.: 743,737

[22] Filed: Aug. 12, 1991

[51] Int. Cl.$^5$ ............................................. A01K 85/00
[52] U.S. Cl. ................................... 43/42.36; 43/42.06
[58] Field of Search ................. 43/42.36, 42.06, 44.99, 43/44.4, 44.2

[56] References Cited

U.S. PATENT DOCUMENTS

| | | |
|---|---|---|
| 2,169,811 | 8/1939 | Nevison . |
| 2,235,600 | 3/1941 | Ammerman . |
| 2,557,577 | 6/1951 | Soma .................................. 43/42.36 |
| 2,640,292 | 6/1953 | Nadolny ............................ 43/42.06 |
| 2,791,056 | 5/1957 | Davis . |
| 3,269,050 | 8/1966 | Garwood .......................... 43/42.36 |
| 3,528,189 | 9/1970 | Lilley . |
| 3,820,269 | 6/1974 | Rae . |
| 3,955,304 | 5/1976 | Reid .................................. 43/42.28 |
| 4,637,160 | 1/1987 | Biskup . |
| 4,803,793 | 2/1989 | Schellenberg . |
| 4,841,664 | 6/1989 | Baldwin ............................. 43/42.36 |
| 4,888,907 | 12/1989 | Gibbs ................................. 43/42.06 |
| 4,930,245 | 6/1990 | Bazzano ............................ 43/42.06 |

Primary Examiner—Richard K. Seidel
Assistant Examiner—Chuck Y. Mah
Attorney, Agent, or Firm—Stephen E. Clark

[57] ABSTRACT

Semi-artificial lure for fishing visually simulates a live fish by embedding within a clear lure body the head end of a natural marine food, such as a small fish, and attaching thereto an artificial tail made of flaccid plastic streamers which extend from the rear of the lure. Leader line extends from the front of the lure, through the mouth and partial belly of the embedded fish, and out through the rear end of the lure body. Hollow chamber, hidden from sight in belly of embedded fish, accommodates vibration-, scent-, ballast-, and light-producing accessories which attract live fish, without compromising the visual resemblance of the lure to a live bait fish.

13 Claims, 5 Drawing Sheets

SEMI-ARTIFICIAL FISH LURE

FIELD OF INVENTION

The present invention relates to fishing lures. In particular, the present invention relates to fishing lures constructed of natural bait imbedded in a transparent and castable material.

BACKGROUND OF THE INVENTION

Many artificial lures are known which are designed to represent one of the foods which fish naturally feed on, and fish are attracted to the lure in the belief that it is a natural food.

A number of prior fishing lures are specifically designed to visually resemble the natural food of the hunted fish. In order to give the visual appearance of the natural food, many artificial lures are simply synthetic replicas of the natural food (such as flies, worms, small fish, etc.) of the hunted fish. Ammerman's lure (U.S. Pat. No. 2,235,600), a molded rubber "fish", is an example of such a lure. Other prior devices accomplish this visual resemblance to a natural food by using photographs of the bait food. Schellenberg (U.S. Pat. No. 4,803,793) and Lilley (U.S. Pat. No. 3,528,189), for example, disclose fishing lures having actual photographs of the bait fish manufactured into the lure. In still other prior devices, whole natural fish are used to provide a visual resemblance to a live food. Nevison (U.S. Pat. No. 2,169,811) and Rae (U.S. Pat. No. 3,820,269), for example, disclose lures in which the entire bait fish is actually cast into a solid transparent material in order to visually expose the bait fish to the hunted fish.

All of such prior lures have limitations as to their effectiveness due to the fact that hunted fish usually do not strike at bait solely because the motionless bait, per se, has the same visual characteristics as a particular animal specie.

For instance, in some cases fish appear to rely on their sense of smell to locate and/or discriminate between potential foods. Davis (U.S. Pat. No. 2,791,056), Biskup (U.S. Pat. No. 4,637,160) and Ammerman (U.S. Pat. No. 2,235,600) disclose examples of semi-artificial lures in which a portion of meat from a natural food of the hunted fish is attached to, or inserted into, the lure in order to provide a scented attraction to a live fish.

All of such prior lures have limitations, because compromises have been made between the visual similarity of those lures with the natural food, and the amount of actual natural food which is used. Generally speaking, in such prior devices, the more the lure "looks" like the natural food, the less it "smells" like the natural food.

Another problem of such prior lures, which rely either on the scent or the visual appearance of the lure in order to attract the live fish, is that many fish also rely on the motion, vibration, or sound of a bait in discriminating between potential foods.

It is well known that the effectiveness of a particularly shaped or configured fishing lure depends, among other things, on the identity of the fish being hunted. Depending on the particular fish being hunted, for example, it may be preferable for a lure to be one color rather than another; or it may be preferable to have the lure skim along the surface of the water rather than sink to a lower depth; or it may be preferable for the lure to make vibrating noises rather than be silent; or it may be preferable for the lure to "swim" in small undulations rather than straight; or it may be preferable for the lure to emit a light rather than not; or it may be preferable for the lure to emit a scent rather than not. A problem of all of the prior lures which are substantially constructed of natural fish foods is that none such prior device can be readily modified for hunting fish (of different species) with the aforementioned sensory stimulants.

OBJECTS

Accordingly, it is the primary object of the present invention to provide a fishing lure in which at least the head portion of a natural animal is visibly embedded inside of a solid material, and from the rear of which solid material flexible appendages extend.

It is another object of the present invention to provide a fishing lure of the character described wherein the flexible appendages can be readily, and securely, attached to the lure.

It is another object of the present invention to provide a fishing lure of the character described in which a leader attached to a hook extends from the rear end of the lure, through the lure, and out of the front of the lure.

It is another object of the present invention to provide a modification of a fishing lure of the character described in which a leader attached to a hook extends from the rear end of the lure, through the lure, and out of the mouth of the natural animal.

It is another object of the present invention to provide a fishing lure of the character described wherein scent(s), light emitting sources, and sound emitting sources vibration level can be user selected and easily changed.

It is another object of the present invention to provide a modification of a fishing lure of the character described having imbedded high density weights which facilitate deep trolling of the lure.

It is another object of the present invention to provide a fishing lure of the character described wherein the means for varying the scent, vibration level, and weight is hidden from view.

These and other objects, features, and advantages of the present invention will become apparent from a consideration of the drawings and the ensuing description thereof.

Figure 3:
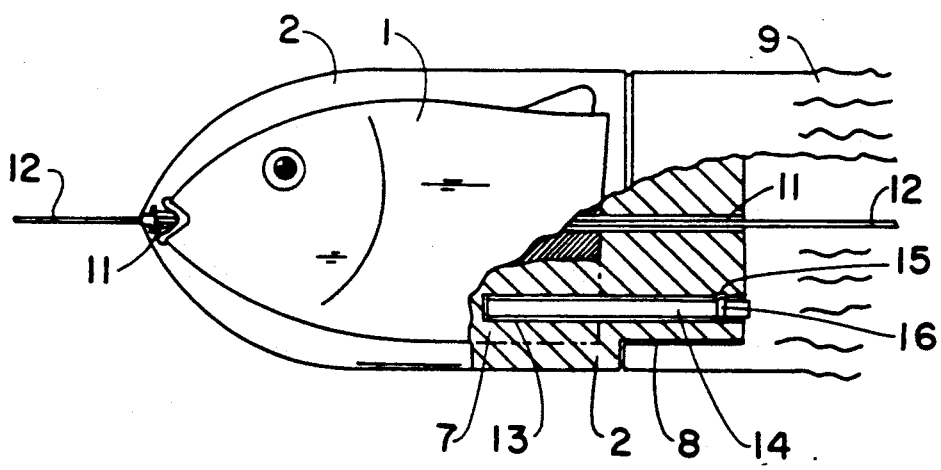
FIG. 3 is a vertical sectional view of the present invention showing in detail the construction of the insert chamber.
Figure 14:
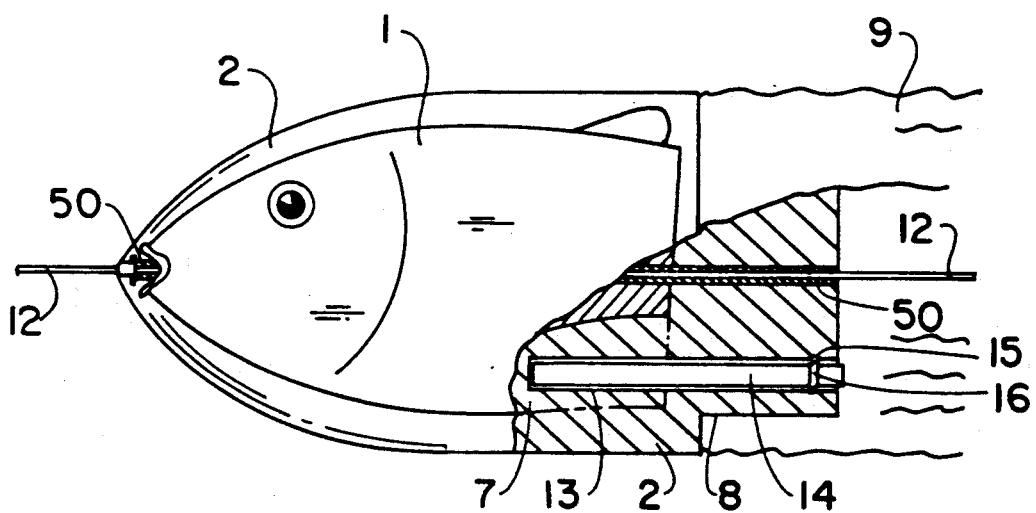

and,

FIG. 14 is a vertical sectional view of the present invention similar to FIG. 3, showing a tunnel formed by a narrow tube through the fish.

DETAILED DESCRIPTION OF THE PREFERRED EMBODIMENT

In the present invention the head end of a natural animal (generally designated 1 in the figures) is embedded inside of a castable material, as described hereinafter, so as to provide a semi-artificial fishing lure whereby the embedded animal is visible to a hunted fish. By way of example the preferred embodiment of the invention will be described wherein the embedded natural animal is a fish. However, it will be appreciated after a consideration of the ensuing description of the invention, that other natural animals 1 (including, for example, squid and shrimp) may also be used.

In the preferred embodiment of the invention, the entire head end, including at least the mouth 3 and gill opening 4 of a natural fish 1, (such as a flying fish or a mackeral), is embedded inside of the lure body 2. The head end of the embedded natural fish 1 may additionally include the fish's trunk (including dorsal fin 5), but should not include the fish's tail (not shown).

The lure body 2 is constructed of a castable material (such as plastic, acrylic, plexiglass, polycarbonate, or polyester resin) which is impermeable to water and through which the embedded fish 1 is visible from the exterior of the lure body 2. The embedded fish 1, being completely surrounded by the lure body 2, is protected against the deteriorating effects of water, air, repeated handling, etc. by the lure body 2. In the preferred embodiment of the invention, the lure body 2 is substantially transparent. In an alternative construction of the invention the lure body 2 may be translucent or tinted, so long as the natural fish 1 is visible from the exterior of the lure body 2.

In the preferred embodiment of the invention, before embedding the natural fish 1 inside of the lure body 2, the natural eyes are preferably removed and replaced by imitation eyes 6, and the guts are removed from the fish's belly 7. The fish 1 is then dipped into a dilute formaldehide solution and subsequently painted with a thin coat of polyester resin (not shown), which serves to preserve the dead fish and facilitates adhesion of the lure body 2 to the embeeded fish 1.

Figure 1:
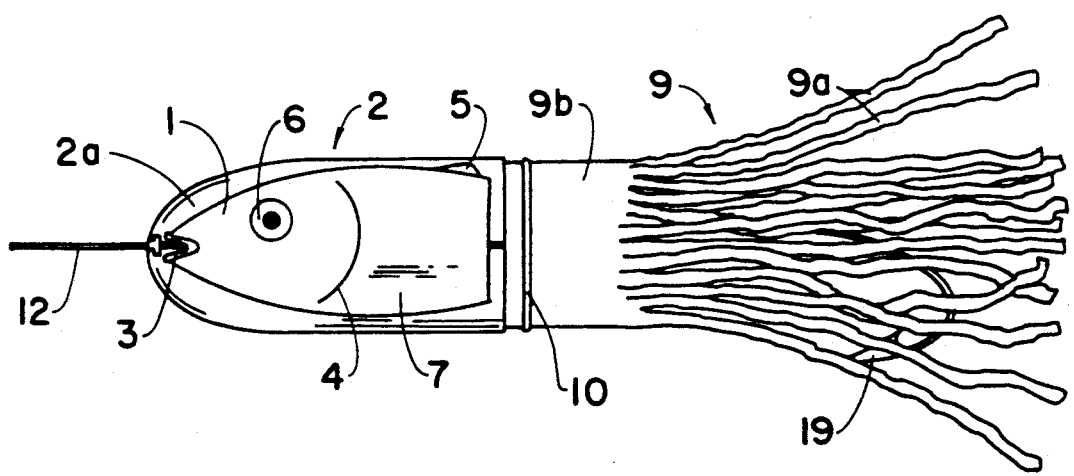
FIG. 1 is a side elevation illustrating a semi-artificial fish lure constructed in accordance with my invention.

Referring to FIG. 1, in the preferred embodiment of the invention the front 2a of the lure body 2 is "bullet" shaped. That is: the lure body is substantially axially symmetrical, and the forward end 2a of the lure body is tapered so as to provide a hydrodynamically smooth profile.

Figure 4:
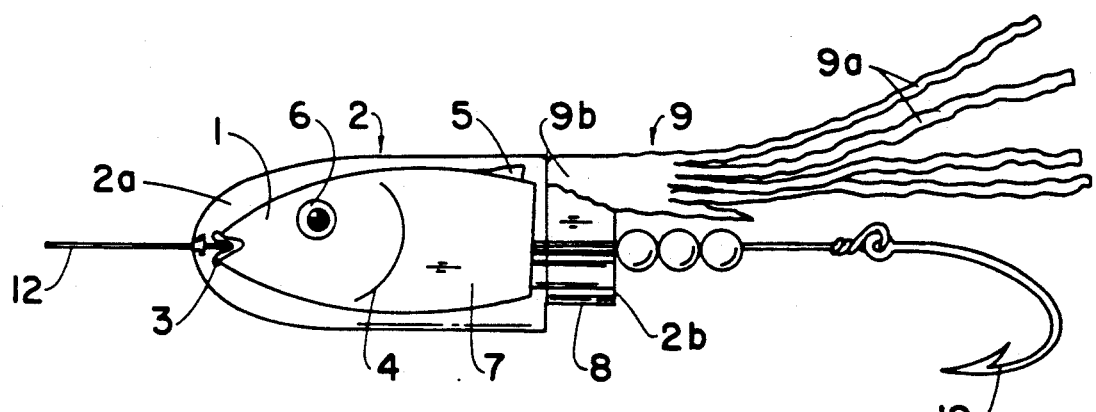
FIG. 4 is a side elevation of the present invention with the tail section partially removed to illustrate the construction of the shoulder of the device.

A turned down shoulder 8 is provided at the rear end of the lure body 2, which facilitates attachment thereto of flaccid tail streamers 9, as shown in FIGS. 1 and 4. The tail streamers 9 are preferably made of plastic, and may be of any color which may appear attractive to a hunted fish. The tail streamers 9 preferably comprise a number of thin plastic strands 9a, (each several inches long), extending from a single plastic skirt 9b. The tail streamers' skirt 9b may be attached to the shoulder 8 by cement or other adhesive (not shown) or may be secured by a cord or band 10 which is tightened around the shoulder 8, as shown in FIG. 1. In operation, the flaccid tail streamers 9 randomly flutter behind the lure body 2 as the device is pulled through the water. It will be appreciated by those skilled in the art that, because the shoulder 8 is turned down (i.e. is of smaller diameter than the lure body 2), hydrodynamic drag caused by the forward edge of the skirt's being pulled through the water is minimized.

It will be appreciated that the device constructed in accordance with the foregoing description has a head section (represented by the lure body 2 and its associated parts) which not only visually resembles the head of a natural food of a hunted fish, but which may, in fact, actually be the head of a natural food of the hunted fish; and has a flexible tail section (represented by the flaccid tail streamers 9) which visually resembles that of a natural food of the hunted fish.

It will also be appreciated by those skilled in the art that the device thus described provides a semi-artificial fishing lure in which the actual head end of a natural bait fish may be assembled to a flaccid tail member having the particular visual appearance (i.e. color(s), length of strands, number of strands, etc.) which is most attractive to the hunted fish.

In the preferred embodiment of the invention a narrow tunnel 11 extends from the front end 2a of the lure body, through the mouth 3 of the natural fish, to the rear end 2b of the lure body. It has been found that the tunnel 11 can be most easily manufactured into the device by inserting a narrow tube 50 through the fish 1 prior to embedding it inside the lure body 2. In the preferred embodiment of the invention the tube 50 is constructed of a clear plastic cylinder, but other materials such as copper tubing may also be used.

In operation, a leader 12 is fitted at one end with a hook 19, and this leader extends freely through the tunnel 11 with the hook normally supported behind the rear end of the lure body 2 and inside the area generally surrounded by the tail streamers 9. In this construction, when a fish strikes the lure and is caught by the hook 19, the lure body 2 tends to slide up the leader 12 out of harm's way.

In some cases it may be desirable for the lure to emit a scent in order to further attract the hunted fish. In the preferred embodiment of the present invention, a hollow chamber 13 extends from the rear end of the lure body, into the lure body 2, as shown in FIG. 3. The hollow chamber 13 preferably extends beyond the shoulder 8 of the lure body into the belly 7 of the embedded fish. It will be appreciated that the present invention will function as described above when the hollow chamber 13 is empty; however, in the preferred embodiment of the invention, one of various chamber inserts, generally designated 14 in the figures, is placed inside of the chamber 13 during use of the device.

Figure 6:
FIG. 6 is a side elevation of a solid chamber insert for use with a modification of the invention.

One such chamber insert 14a is shown in FIG. 6. Chamber insert 14a is simply a solid slug, generally corresponding in shape to that of the hollow chamber 13. Chamber insert 14a may be constructed of any solid material having a sufficient weight to give the lure assembly an overall density which is desired by the user. The chamber insert 14a preferably is substantially the same length as the hollow chamber 13, but it may alternatively be either longer or shorter than the chamber. In the preferred embodiment of the invention the chamber 13 and chamber insert 14a are provided with corresponding detente 15 and lip 16, respectively, which help lock the chamber insert 14a in position. However, any common locking methods (including helical threads, twist locks, press fits, locking pins, etc.) may be used in lieu of the detente-and-lip construction.

It will be appreciated by those skilled in the art that by adjusting the weight of the insert 14a, the density, and therefore the buoyancy, of the lure can be controlled by the user. Additionally, by this same method the device can be ballasted so as to effect the upright orientation of the lure when in operation.

Figure 10:
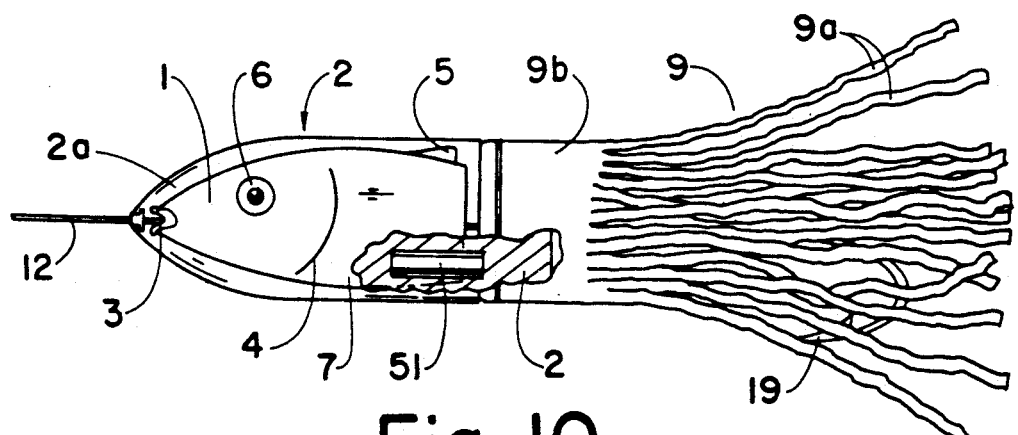
FIG. 10 is a side elevation of a modificatin of the present invention showing an embedded ballast weight.

Another modification of the present invention is shown in FIG. 10. In this modification of the invention a high density solid ballast weight 51 is simply embedded into the lure body 2 and, preferably, inside of the fish's belly 7. Although not removable, this embedded ballast weight 51 performs essentially the same ballasting functions as chamber insert 14a.

Figure 7:
FIG. 7 is a side elevation of a modification of a chamber insert for use with the invention.

A second chamber insert 14b is shown in FIG. 7. In some instances it has been found preferable to provide an olfactory attraction, in addition to a visual attraction, in order to sufficiently encourage a hunted fish to strike. Chamber insert assembly 14b comprises an open ended vessel 61 and a porous member 31 (such as sponge or fabric) which has been soaked in any liquid solution (not shown) having a scent which is attractive to the hunted fish. As the lure is pulled through the water, the solution gradually releases into the water due to the pressure of the water against the sponge.

Figure 8:
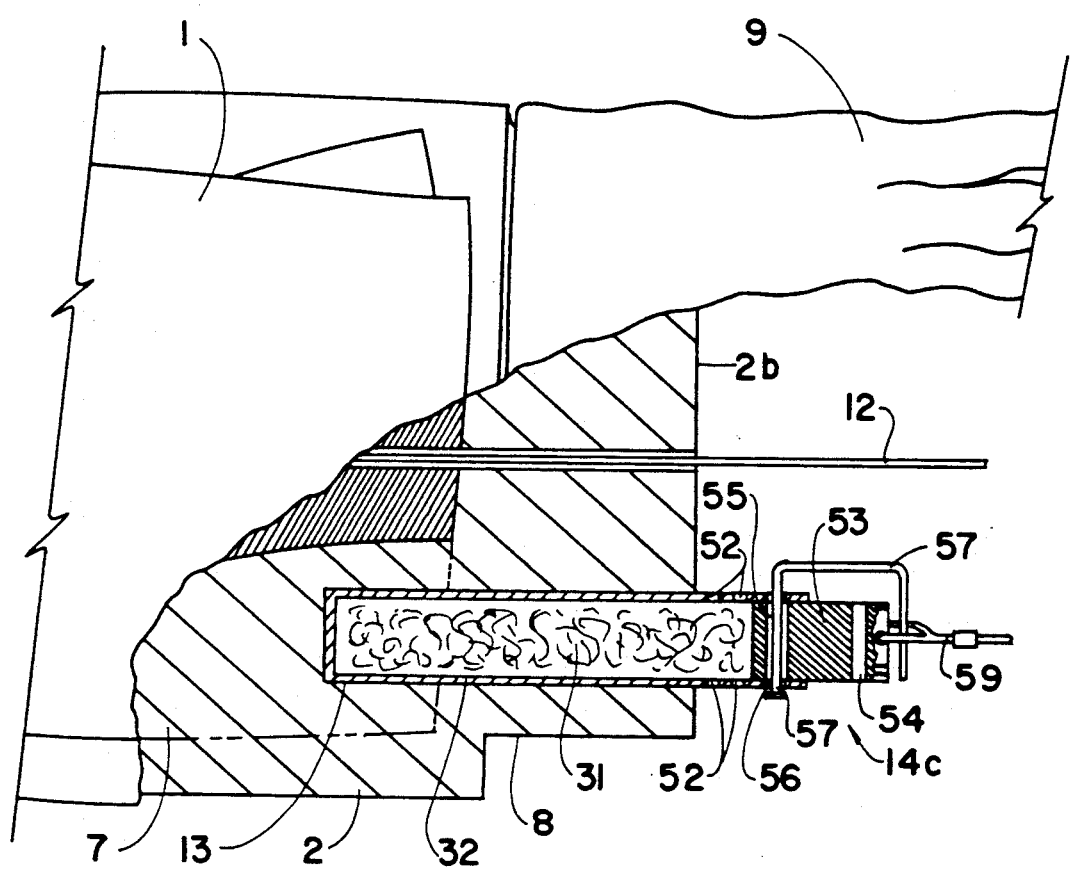
FIG. 8 is a side elevation in partial section of the shoulder of the present invention showing a modification of a chamber insert for use with the invention.

Alternatively, insert assembly 14c (shown in FIG. 8) comprising a vessel 32 in which either a liquid solution (or a porous member 31 soaked in such a liquid solution) having a scent which is attractive to the hunted fish is contained, may be used. In this modification of the of the invention (FIG. 8), the scented solution (not shown) slowly leaks out of the vessel 32 through holes 52 into the water. As shown in FIG. 8, the vessel 32 is capped at one end by a plug 53 having two locking holes 54 and 55, respectively. In order to allow the solution to flow out of the vessel 32, locking hole 55 in plug 53 is aligned with corresponding locking holes 56 in the vessel 32, and a locking pin 57 is inserted through the holes to hold the parts together, as shown in FIG. 8. Locking pin 57 may be made of heavy gauge nylon fishing line, or of any other solid device which holds the plug 53 to the vessel 32.

It will be appreciated by those skilled in the art that, because the hollow chamber 13 is located behind the skirt 9b of the tail streamers and is inside of the belly 7 of the embedded natural fish, the chamber 13 (as well as its contents, insert 14) is hidden from view from the exterior of the device, and, accordingly, does not detract from the visual resemblance of the lure to a bait fish.

Figure 5:
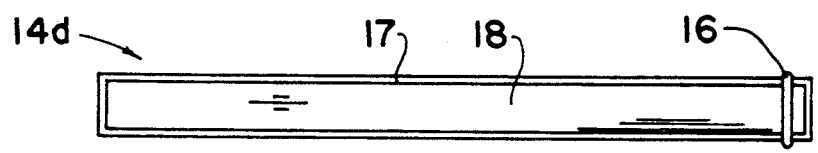
FIG. 5 is a side elevation of a chamber insert for a luminous compound for use with a modification of the invention.

Another chamber insert assembly 14d is shown in FIG. 5. In some instances it has been found that illuminating lures may make them more attractive to particular hunted fish. Insert 14d comprises a transparent cylindrical container 17 which contains a luminous chemical compound 18. Although housed partially inside of the belly 7 of the embedded fish, and partially inside of the skirt 9b of the tail streamers, the luminous chemical compound 18 emits sufficient light to be visually perceptible from the exterior of the lure body 2.

Figure 11:
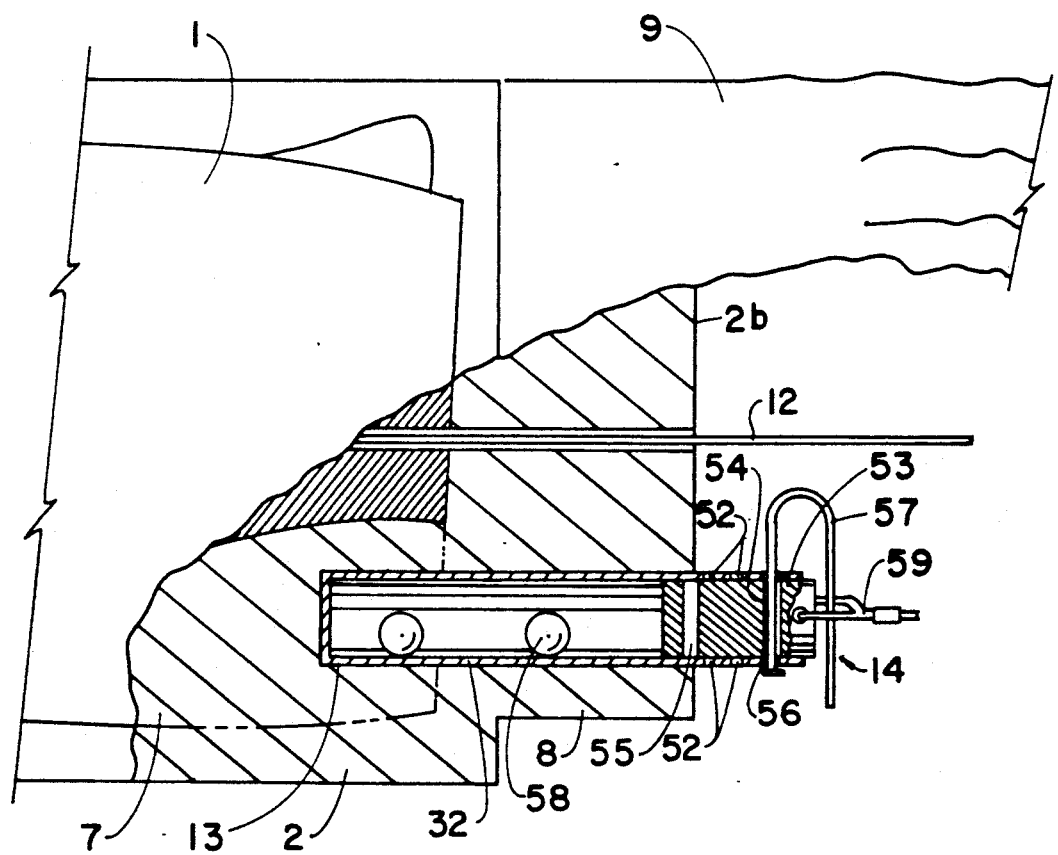
FIG. 11 is a sidel elevation similar to FIG. 8 showing a noise-effecting chamber insert.

Another chamber insert assembly 14d is shown in FIG. 11. In some instances it has been found that rattling sounds attract fish. Insert assembly 14d comprises one or more small rigid balls 58 (such as from a ball bearing), which creates a rattling-sound as the lure moves through the water. The rigid balls 58 are inserted inside of vessel 32 and are held inside of the vessel 32 by plug 53 which, in this application of the invention, may be secured in place by a locking pin 57 which extends through aligned holes 54 and 56 in the pluge 53 and the vessel 32, respectively. In this configuration (FIG. 11) the forward end of the plug 53 covers holes 52 in the vessel 32, which prevents water from entering the vessel 32 and allows the ball(s) 58 to move freely inside of the vessel 32. Locking pin 57 is preferably made of a semi-rigid nylon line which can be bent back through a loop in a pull cord 59 which is attached to plug 53. The pull cord 59 is used both to withdraw the plug 53 from the vessel 32, and to secure the locking pin 57 in place.

Figure 2:
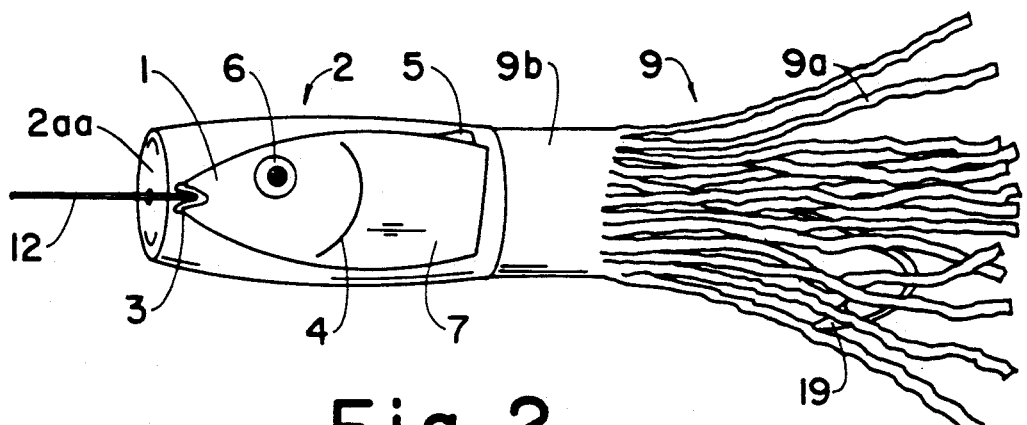
FIG. 2 is a side elevation illustrating a modification of the present invention having a flat front portion.
Figure 12:
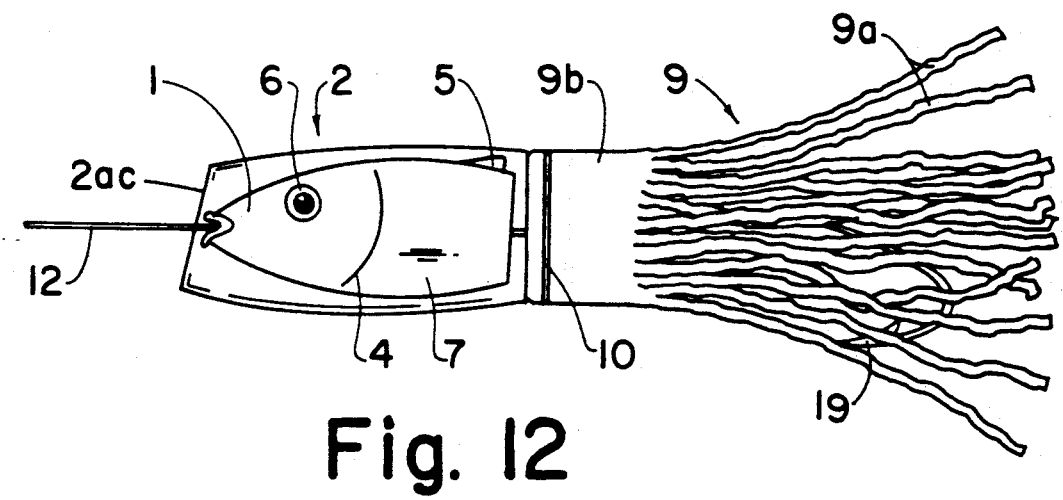
FIG. 12 is a side elevation illustrating a modification of the present invention having a slanted front portion; and, FIG. 13 is a side elevation illustrating a modification of the present invention having a "swimming head" front portion.
Figure 13:
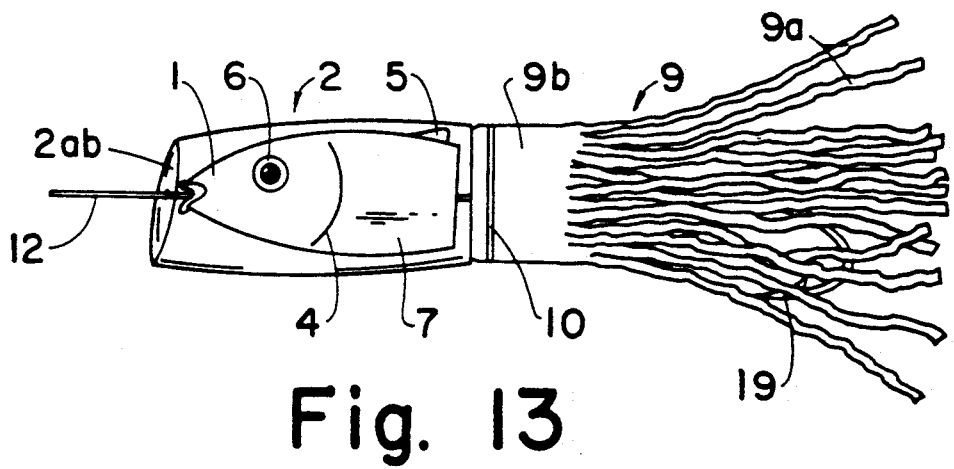

Although the body of the lure 2 is preferably axially symmetrical and substantially bullet-shaped, the scope of the present invention also encompasses transparent solid lure bodies which may neither be bullet-shaped nor necessarily axially symmetric. Important modifications of the present invention are shown in FIGS. 2, 12 and 13. In these constructions of the invention, the lure body 2 has a "flat head", a "slant head", and a "swimming head", respectively. These particular constructions of the lure body 2 have the advantage of imparting unique action to the lure and preferentially attract fish. For Example: The "flat head" 2aa construction shown in FIG. 2 swims straight but produces a bubble trail (called "smoke" in the trade) when pulled; the "swimming head" 2ab construction, (also known as a "Kona" head), shown in FIG. 13 swims left-then-right when pulled through the water; and the "slant head" 2ac construction shown in FIG. 12 tends to bob up and down when pulled through the water.

Figure 9:
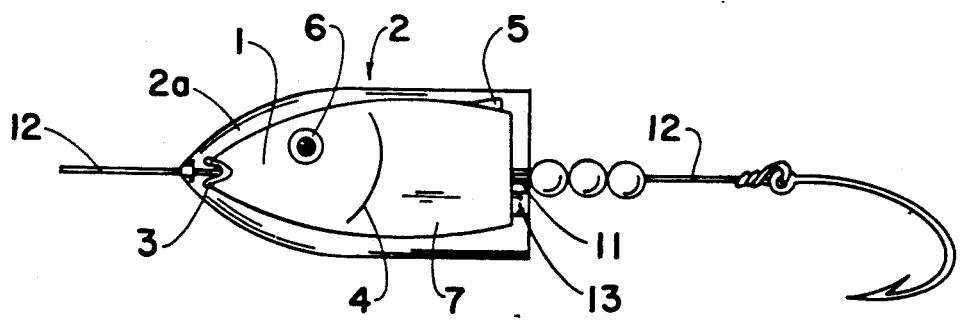
FIG. 9 is a side elevation of a modification of the present invention constructed without a flaccid tail member.

While the above description contains many specificities, these should not be construed as limitations on the scope of the invention, but rather as an exemplification of one preferred embodiment, and certain modifications, thereof. Many other variations are possible, for example:

- The lure may be used without a hook 19, in which case the device would be used as a "teaser" which attracts the hunted fish but which, itself, does not catch the hunted fish;
- The size of the lure, as well as the natural fish embedded therein may be varied as to be more attractive to certain species of fishes;
- The lure body 2 may be clear, milky, or tinted;
- In addition to the chamber inserts 14 described above, other articles such as electrically- or biologically-generated (rather than chemically-generated) illuminating devices, or slivers or cuts of bait foods, etc., may be inserted into the chamber 13 to attract the hunted fish;
- The lure body 2 can be constructed without a shoulder;
- The chamber 13 may open to the side or front of the lure body 2, rather than the back of the lure body;
- The leader 12 may be secured to external eyes or similar fastening appurtenances on the exterior of the lure body 2, rather than extend through the lure body;

The hollow tunnel 11 through the lure body 2 may extend either along the axis of the body or off-center through the lure body, and may extend either through the natural animal 1 or beside it;

The belly of the natural fish may simply be removed (i.e. cut away) rather than gutted;

The lure may be constructed without a flaccid tail 9, for example as shown in FIG. 9;

Accordingly, the scope of the invention should be determined not by the embodiment illustrated, but by the appended claims and their legal equivalents.

I claim:

1. A fishing lure comprising:
    a body;
    a natural bait member completely embedded within said body;
    said natural bait member being visible from exterior of said body, said body sealing and protecting said natural bait member against the deteriorating effects of water, air and repeated handling;
    said natural bait comprising a dead natural marine animal from which the natural tail section is removed;
    and means for attaching a line to said body;
    wherein said body comprises a castable material, said body having an axis substantially parallel to the length of said natural bait, and said body having a forward end and an aft end;
    and further comprising means for attaching an artificial tail to the aft end of said body;
    wherein said means for attaching an artificial tail to the aft end of said body comprises a shoulder member, said shoulder member being disposed at the aft end of said body and being of smaller cross sectional area than the maximum cross sectional area of said body;
    and further comprising an artificial tail member attached to said shoulder;
    and wherein said artificial tail member comprises a plurality of flaccid elongated members extending rearwardly from said body;
    and wherein said means for attaching a line to said lure comprises a tunnel through said body, extending from the aft end to the forward end of said body;
    and wherein said tunnel passes through the mouth of said natural marine animal;
    and further comprising:
        a chamber disposed within said body;
        and a first opening in said body, said first opening leading from the exterior of said body to said chamber.

2. The device according to claim 1 wherein said first opening is located at the aft end of said body.

3. The device according to claim 2 further comprising a filler member adapted to be operatively inserted into said chamber through said first opening.

4. The device according to claim 3 wherein:
    said natural marine animal is a fish;
    and wherein said chamber extends into the belly of said fish.

5. The device according to claim 4 further comprising means to secure said filler member inside of said chamber.

6. The device accordance to claim 5 further comprising:
    a leader line extending through said tunnel, one end of said leader line being attachable to a fishing line;
    and a fish hook attached to the other end of said leader line.

7. The device according to claim 6 wherein said forward end of said body is hydrodynamically shaped.

8. A fishing lure comprising:
    a body, said body comprising a moldable material;
    a natural bait member completely embedded within said body;
        said body having an axis substantially parallel to the length of said natural bait, and said body having a forward end and an aft end and an outside surface;
        said natural bait member having a first end corresponding to the head-end of the natural bait member, and having a second end opposite said first end of said natural bait member;
        said natural bait member being oriented within said body such that first end of said natural bait member is disposed relatively nearer to said forward end of said body, and said second end of said natural bait member is disposed relatively nearer to said aft end of said body;
        said natural bait member being visible from the exterior of said body, said body sealing and protecting said natural bait member against the deteriorating effects of water, air and repeated handling;
        said natural bait comprising a dead natural marine animal from which the natural tail section is removed;
    and further comprising means for attaching a line to said body;
        said means for attaching a line to said body comprising a tunnel through said body;
    and further comprising means for attaching an artificial tail to the aft end of said body;
        wherein said means for attaching an artificial tail to the aft end of said body comprising a shoulder member, said shoulder member being disposed at the aft end of said body and being of smaller cross sectional area than the maximum cross sectional area of said body;
    and further comprising an artificial tail member attached to said shoulder.

9. The device according to claim 8, wherein said tunnel extends from said aft end to said forward end of said body.

10. The device according to claim 9, wherein said tunnel comprises a narrow tube at least partially disposed within the mouth of said natural bait member.

11. A method for manufacturing a fishing lure comprising the steps of:
    removing the tail from a natural fish;
    inserting a narrow tube through said natural fish;
    molding a lure body member around said natural fish and said narrow tube, such that said natural fish is completely embedded within said lure body member;
        wherein said lure body member comprises a transparent solid material having a forward end corresponding to the head-end of said natural fish, and aft end opposite said forward end, and a hydrodynamically configured outer surface;
    attaching a flaccid tail member to said aft end of said lure body member;

and attaching a line to said lure body member by inserting said line through said narrow tube.

12. A fishing lure comprising:
a body;
a natural bait member completely embedded within said body;
said natural bait member being visible from the exterior of said body, said body sealing and protecting said natural bait member against the deteriorating effects of water, air and repeated handling;
said natural bait comprising a dead natural marine animal from which the natural tail section is removed;
and means for attaching a line to said body;
and said body having an axis substantially parallel to the length of said natural bait, and said body having a forward end and an aft end;
and the head-end of said natural marine animal being disposed relatively nearer to said forward end of said body than to said aft end of said body;
and further comprising means for attaching an artificial tail to the aft end of said body; and
wherein said means for attaching an artificial tail to the aft end of said body comprises a shoulder member, said shoulder member being disposed at the aft end of said body and being of smaller cross sectional area than the maximum cross sectional area of said body; and further comprising an artificial tail member attached to said shoulder;
wherein said artificial tail member comprises a plurality of flaccid elongated members extending rearwardly from said aft end of said body; and
wherein said means for attaching a line to said lure comprises:
a tunnel through said body, extending from the aft end to the forward end of said body.

13. The device according to claim 12 wherein said tunnel passes through the mouth of said natural marine animal.

* * * * *